Figure 1:
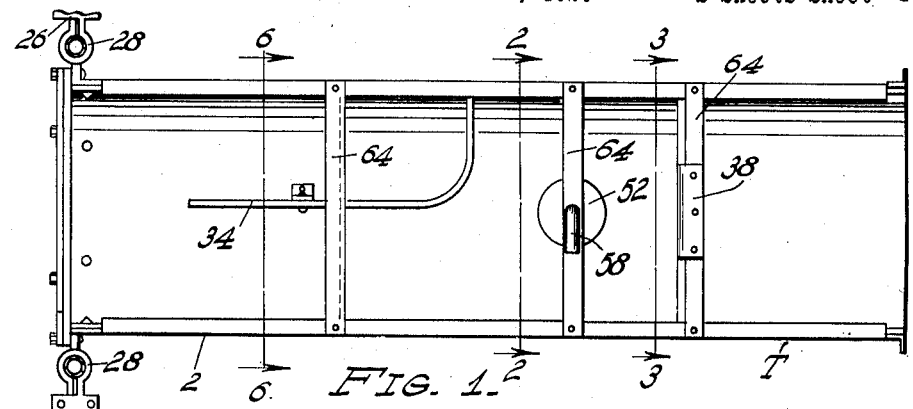

Jan. 22, 1929.

P. R. G. BIEDERMANN 1,699,948

FLUME AND SETTLING TROUGH

Filed Dec. 18, 1926    2 Sheets-Sheet 1

INVENTOR.
P.R.G. BIEDERMANN
BY Fred H. Hayne
ATTORNEY.

Jan. 22, 1929.

P. R. G. BIEDERMANN 1,699,948

FLUME AND SETTLING TROUGH

Filed Dec. 18, 1926    2 Sheets-Sheet 2

INVENTOR.
P.R.G. BIEDERMANN
BY
ATTORNEY.

Patented Jan. 22, 1929.

1,699,948

UNITED STATES PATENT OFFICE.

PAUL ROBERT GEORGE BIEDERMANN, OF LOS ANGELES, CALIFORNIA.

FLUME AND SETTLING TROUGH.

Application filed December 18, 1926. Serial No. 155,754.

My invention relates to fluid settling and decanting apparatus, more especially adapted for oil or other well use, wherein the circulating medium, such as rotary mud, used in drilling operations, may have effectively removed therefrom any extraneous matter, such as sand and the like.

As is well known, the rotary mud used in oil well practice serves the purpose of lubricating the drill or other oil well tool, to prevent the same from burning or running hot, to carry away the material cut to the surface of the well, and to seal off the open hole, before the casing has been inserted. To accomplish these results, the mud must be free from sand, and the primary function of my apparatus is to reduce the sand content of the circulating medium by the settling or decanting process.

Since the circulating medium is pumped under considerable pressure, it flows from the well at a high rate of velocity; hence to settle effectively the sand and other extraneous matter from the circulating medium, means must be provided for checking the velocity of said medium, and reducing the same to as low a rate as it is possible to attain.

It accordingly is an object of my invention to associate with the circulating medium pumping apparatus, a combined settling trough and flume, preferably of steel, providing a standardized unit which is easily transported and erected, said trough being made in sections of suitable lengths, and equipped with a set of baffles preferably of different size and character, said baffles progressively checking the flow of said medium, thus settling out the sand, and reducing the wear on the pump to a minimum as well as sealing off the wall of the well before the casing is installed, suitable clean-out means, such as any preferred form of doors, being provided at suitable intervals whereby the sand may periodically be cleaned from the trough, a discharge flume being connected to the discharge end of said trough, which flume leads to the suction tank associated with the pump.

It is also within the province of my invention to provide the discharge flume connected with the pump suction tank with a flexible joint of any preferred kind whereby the section of said flume associated with said tank may be swung to either side in order to accommodate any difference in distance from the well center to said tank. Such a joint may be made of leather, heavy canvas or metal, provided with corrugations or extensible and retractable folds for accomplishing the required flexibility.

The above objects and advantages, and those hereinafter appearing, I attain from the disclosure in the specification and the drawings forming a part of this application.

Figures 2, 3:
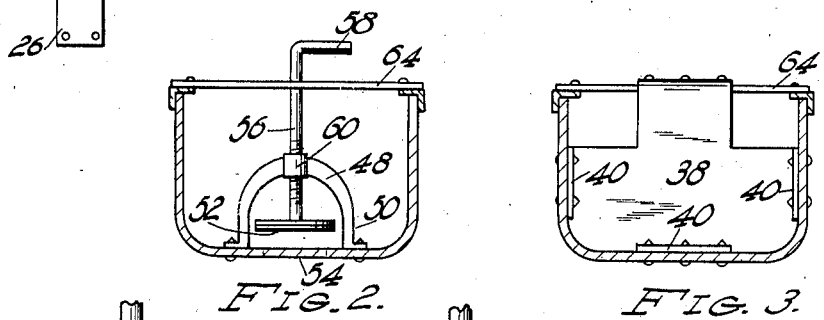
Figures 4, 5:
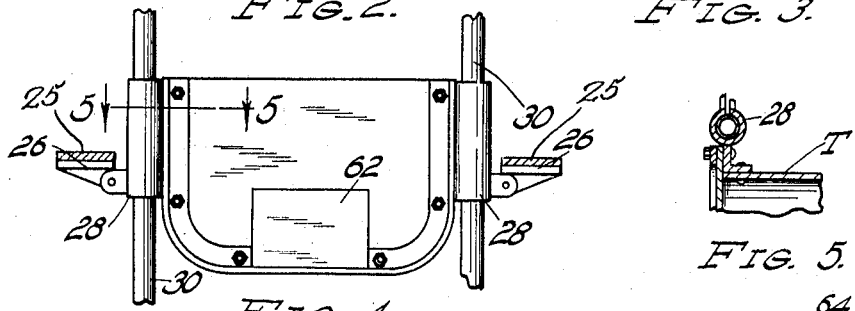
Figure 6:
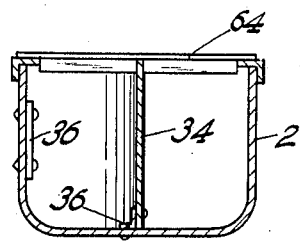
Figure 10:
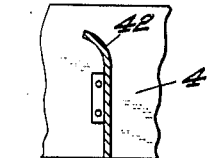
Figure 8:
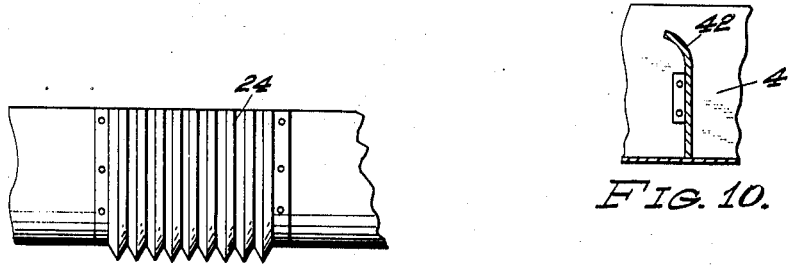
Figure 9:
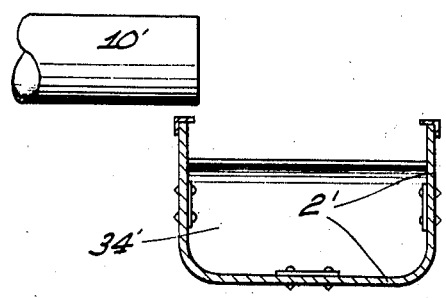

Reference is had to the accompanying drawings, in which similar reference characters denote similar parts. In the drawings, Fig. 1 is a top plan view of the inlet section of the settling trough, showing also in fragmentary form the manner in which it is supported, Fig. 2 is a cross-sectional view on the line 2—2, Fig. 1, looking with direction of the arrows and showing a suggestive form of cleanout door open, Fig. 3 is a similar view on the line 3—3, Fig. 1, also looking in the direction of the arrows, and showing the preferred form of fluid baffling means positioned at that point, Fig. 4 is a fragmentary end view of Fig. 1, looking from the left of said Fig. 1, Fig. 5 is a fragmentary detail sectional view on the line 5—5, Fig. 4, looking in the direction of the arrows, Fig. 6 is a cross-sectional view on the line 6—6, Fig. 1, also looking in the direction of the arrows, Fig. 7 is a top plan view of the entire apparatus showing the manner in which it is associated with the well tubing and the suction tank, Fig. 8 is a fragmentary side elevational view showing the flexible point, Fig. 9 is a fragmentary detail cross-sectional view of a modified form of my invention, and Fig. 10 is a cross-sectional view of one of the baffles.

Describing my invention more in detail, as hereinbefore stated, the circulating medium is pumped through the tool stem under considerable pressure by the pump associated with the rig, and it flows from the well at a high velocity rate. In order, therefore, to settle out all extraneous matter, such as sand and the like, pumped from the well, the medium containing such matter must have its velocity reduced as much as possible. To this end, I accordingly provide a sectional trough, designated generally by the reference character T.

Any preferred number of sections for the trough T may be provided, such sections being preferably open at their tops, and constructed of steel, forming standardized units, which may be replaced from time to time, and which may be easily transported and erected and easily handled, said sections being made of convenient lengths as desired. This provides for simplicity and long life, and nothing is left to guesswork of the operators.

Figure 7:
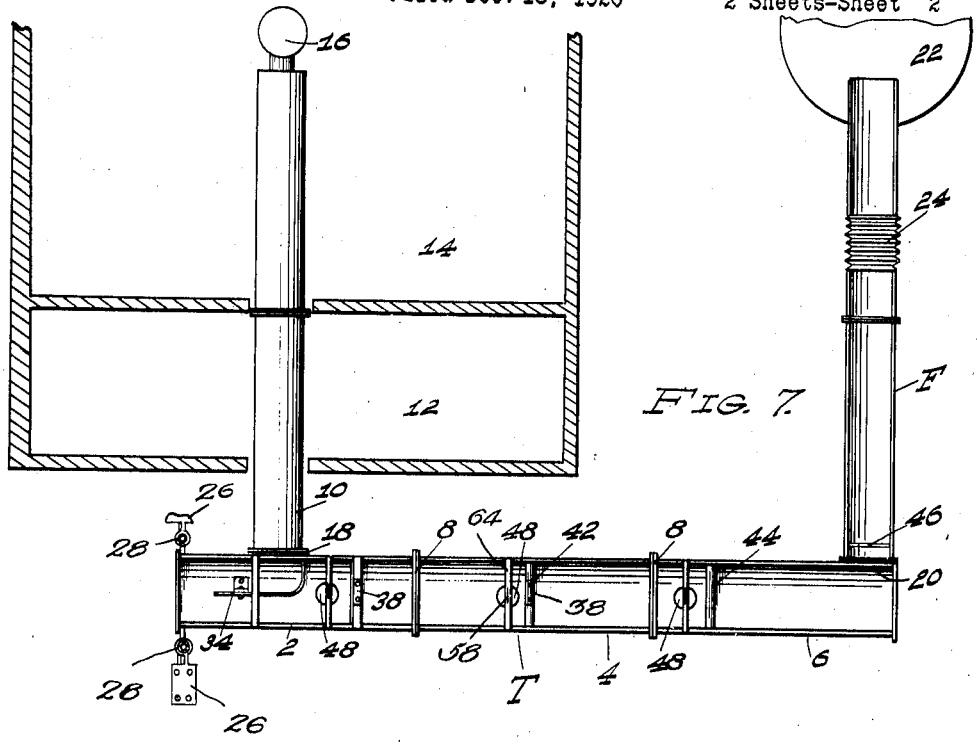

As seen in Fig. 7, in the present instance the trough T comprises three sections 2, 4 and 6, connected together by suitable joints 8, preferably flanged, and equipped with suitable gaskets, fastened to said flanges, so that they may not be lost, while moving the apparatus from one location to another, said gaskets, of course, preventing any leakage of the fluid. Associated with the inlet section 2 is the piping 10, consisting of any desired number of lengths connected together in any preferred manner, which piping passes through the bull wheel house 12 across the derrick floor 14, to the conductor 16 leading to the well, the piping 10, in this form of my invention being directly connected to the section 2 by the flanged or other joint 18.

The last section 6 of the trough T is equipped with an outlet 20, suitably connected with the discharge flume F which leads to the suction tank 22 into which the purified circulating medium is discharged so that it may again be introduced into the well to provide for cooling the tool as it is conveyed thereto through its stem.

If desired, the flume F may be made up of any preferred number of sections, one of which may be equipped with a flexible joint 24, which may be constructed of leather, heavy canvas or metal, corrugated or made of folds, so that the section of said flume associated with the suction tank 22 may be swung sideways to accommodate any difference in distances between the well and said tank.

As seen more particularly in Figs. 1 and 4, the flanges of the joints are equipped with bracket extensions 26, to which may be secured the board walk 25 used by the operators as they clean out or flush the sand or other extraneous matter from the trough, said flanges being also provided with pipe flanges 28 bolted or otherwise associated with the flanges of the joints, a set of pipes 30, equipped with holes 32 being provided for holding said pipes in position on the trough, whereby it may be adjustably supported, by raising or lowering of the same, suitable bolts or other means being provided for this purpose. It will be clear, however, that any other means for supporting or adjusting the trough may be provided and still remain within the province of my invention.

The inlet section 2, as seen in Figs. 1, 6 and 7, is equipped with an inlet baffle 34, preferably shaped as shown, and secured in position within the trough by any suitable means such as the angle irons 36. Said inlet baffle is so shaped and so placed as to deflect the incoming fluid from the piping 10 as to check or break its high velocity under which it issues from the well. In practice, the width of the trough is more than ten times the inlet area, and this assists in converting the fluid or circulating medium into a slow moving mass, its flow being reversed by said baffle and then moved forwardly through the section 2 until it reaches the baffle 38, which may be of a form depicted in Fig. 3, that is to say, of T form, to permit the flow of the fluid to continue, but at the same time to hold at rest the greater mass of said fluid sufficiently long to settle out or decant the coarser ingredients, such as sand, from said fluid. Of course, any other form of baffle or screen may be used.

It is not intended to settle out all of the extraneous materials from the circulating medium in the section 2, but only the heavier portions. The lighter portions of said medium will now discharge over the top of the baffle 38, and through the openings thus provided by said baffle, overflowing into the next section 4. Said baffle may be associated with the trough T in any manner preferred, as by means of angle irons and rivets 40.

The circulating medium when it reaches the section 4 has its movement checked still more by reason of the baffle 42, shown more particularly in Fig. 10, the top portion of which is preferably curved in a direction toward the oncoming fluid or against the direction of fluid flow, thus tending to settle out additional sand or ingredients in said fluid, and of course preventing any increase in velocity, after which the fluid flows into the section 6, where its flow is again baffled by the baffle 44, which may be shaped like the baffle 42, or otherwise, thus settling out more of the extraneous matter. From the section 6, the fluid is discharged into the flume F, said fluid being again baffled by any preferred form of baffle 46, the purified fluid passing into the suction tank 22, thus providing for a continuous action, progressively eliminating the extraneous materials. Any number of baffles and sections may be provided, and these may be shaped and formed as in practice preferred.

Each compartment or section of the apparatus may be equipped with one or more cleanout holes or doors 48 of suitable form, one form being shown in Fig. 2. A suitable framework 50, anchored to the floor of the trough, is provided, and a door or valve 52, adapted to open or close the hole 54, may be used to close said hole, a stem 56, with an operating handle 58 being provided for operating said valve, either by turning the same through a threaded connection 60, or otherwise. It will be understood, of course, that any other form of cleanout means may be substituted for that just described, and still remain within the province of my invention.

If desired, the outer end of the inlet section 2 may also be equipped with a cleanout door 62 of any desired form as shown in Fig. 4. As shown in Fig. 1, suitable braces 64, for the baffles, or for other portions of the trough, may be provided for strengthening the sides of said trough against the pressure of the fluid. The sand or extraneous matter may be cleaned out from time to time from any individual section, permitting the fluid to remain in the other sections, thus preventing any undue loss of the mud or fluid. Moreover, the trough is formed of exceptionally large size to permit a thorough separation of the sand from the mud, which sand remains in the bottom of the trough until cleaned out periodically, the rotary mud passing on to the suction tank.

In Fig. 9 I have shown a modified form of my invention where the piping 10' is merely positioned above the section 2', a straight baffle or screen 34' being used instead of the angular baffle 34, the fluid being merely introduced in the section 2' as shown, said piping being unconnected with said section.

While I have thus described my invention with great particularity, it will be obvious that it may be modified throughout a wide range. I accordingly do not propose to be limited to the exact details of construction shown and described, but reserve the right in practice to make any and all modifications thereof that fall within the scope of the appended claims.

I claim as my invention:

1. In an apparatus for purifying the rotary mud used in wells, an open-topped sectional trough, an inlet therefor, a curved overflow baffle positioned in front of said inlet for initially baffling the flow of the mud introduced into said trough at a substantial velocity, but at the same time permitting the deposit of portions of the extraneous matter present in said mud, sets of T-shaped overflow baffles positioned in the various sections for progressively baffling the flow of said mud to deposit progressively the large and fine parts of said extraneous matter, an outlet for said trough, and a discharge flume at right angles to said outlet for receiving the purified mud.

2. In a mud flume and settling trough for wells, in combination, an open-topped sectional trough, a set of overflow baffles in said trough, a clean-out door in the bottom of each section, a set of standards for supporting said trough, adjusting means associated with said trough and said sections for adjusting said trough along the length of said standards and a boardwalk associated with said adjusting means extending longitudinally of said trough.

3. In an oil or other well apparatus, a set of appliances for conveying a circulating medium to and from said well, one of said appliances comprising a mud flume and settling trough, overflow means in said trough for baffling the flow of said medium, means for periodically removing the impurities deposited in the bottom of said trough from said medium, means for adjusting the height of said trough, and means associated with said last means for supporting a walk for the operators of said apparatus.

4. A well circulating medium purifying apparatus comprising a set of conduits leading to and from said well, a trough adapted to receive said medium from one of said conduits and discharging the purified medium into another of said conduits, a flexible joint associated with one of said conduits whereby one of said conduits may be swung sideways, one of said conduits being connected at an angle to said trough, the other of said conduits being free from said trough, means for adjustably supporting said trough, means associated with said trough for purifying said medium, and means in the bottom of said trough whereby the impurities in said medium may be periodically removed.

In testimony whereof I have signed my name to this specification.

PAUL ROBERT GEORGE BIEDERMANN.